July 2, 1963 L. J. SEMON 3,096,404

TELEPHONE SWITCHBOARD PATCHING UNIT

Filed Aug. 24, 1961

*INVENTOR.*

LAWRENCE J. SEMON

BY *Elliott & Pastoriza*

*ATTORNEYS*

United States Patent Office 3,096,404

Patented July 2, 1963

3,096,404

TELEPHONE SWITCHBOARD PATCHING UNIT

Lawrence J. Semon, 713 Wilshire Blvd., Santa Monica, Calif.

Filed Aug. 24, 1961, Ser. No. 133,643
7 Claims. (Cl. 179—42)

Figure 1:
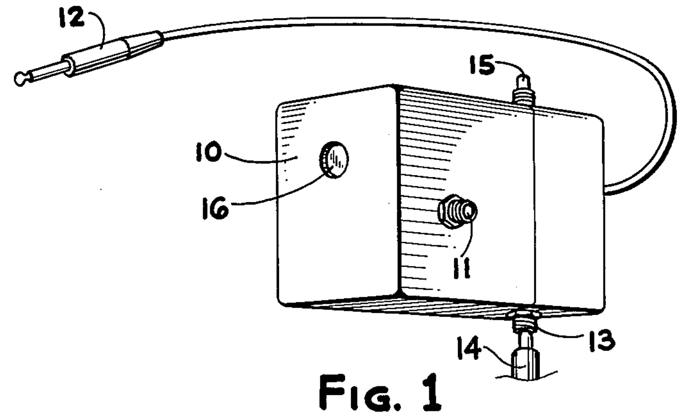

This invention relates generally to telephone switchboard "patching," and more particularly to an improved patching unit for enabling telephone answering switchboard operators to connect an incoming call with an outgoing call.

In telephone answering services, an operator will oftentimes receive a call for a subscriber in which the calling party wishes to speak with the subscriber. In those instances that the subscriber has left a message with his telephone answering service where he may be reached on a telephone, the operator at the answering service may dial out to the subscriber and then directly connect the incoming caller to the subscriber. This latter operation is referred to in the art as "patching" and is normally achieved by simply connecting the outgoing call plug directly into the incoming call jack after the subscriber has been reached.

A major problem involved in the above-described operation arises from the fact that the operator cannot tell when the "patched" call is completed. If the lines are connected long after the telephone call has been completed, they are tied up which will prevent other callers from reaching the subscriber's answering service. In addition, the subscriber may be prevented from using his own telephone.

While I have been able to overcome the above problems by designing patching circuits which provide supervision as well as improved transmission between the incoming call and outgoing call, such devices usually require a separate voltage source and can become expensive to manufacture as a result. Further, normal switchboards include supervision means in the form of a light and/or buzzer, and it would be advantageous to provide a unit which will use this supervision means to monitor the patched call.

With the foregoing in mind, it is a primary object of this invention to provide an improved patching unit for patching incoming and dialed out telephone calls in an answering service which does not require any outside voltage source but is wholly operated by voltage available at the terminals of the outgoing calling jack in the switchboard to the end that a more efficient and less expensive unit is provided.

More particularly, an object of this invention is to provide a patching unit which is designed to operate the normally present switchboard supervising indicator light and/or buzzer to signify completion of a "patched" call so that a relatively simple and economical circuit may be used.

Another object is to provide a patching unit which, in addition to operating the normally present supervising indicator light and buzzer may also incorporate a suitable indicating means which may either be a light or buzzer for signifying completion of the patched call. This latter type unit is useful on switchboards which may not include the normal supervising light and/or buzzer.

Other objects of this invention are to provide an improved patching unit which is extremely compact, may be readily inserted on most standard telephone answering switchboards in a convenient position for use by the operator, and which is very simple to operate so that skilled personnel are not necessary and essentially no further manual operations above those normally employed in simply patching a call by a straight-through connection are involved.

Briefly, these and many other objects and advantages of this invention are attained by providing a patching unit including a housing incorporating circuit means for effecting and supervising the desired patching. The housing itself preferably includes means for receiving an incoming call plug as well as a dialing out plug. Also included is a flexible line terminating in a plug for insertion in a calling-out jack. Suitable holding, control switch means, and signal means within the housing are connected in such a manner as to be automatically responsive to insertion and removal of the incoming call plug into and from the housing for effecting desired connections. The holding means is operable by a simple push button on the top of the housing so that a dialed out number may be held pending insertion of the incoming call plug. There is thus avoided the possibility of losing any calls when using the unit.

An important feature of the invention resides in suitable connections within the circuit means for applying voltage available at the terminals of the outgoing called jack to suitable terminals on the incoming call plug for actuating the normally present supervising indicators within the switchboard. Thus, switchboard supervision is provided for the patched call. This supervision may be in place of or in addition to the signal supervision means incorporated in the housing itself.

Figure 2:
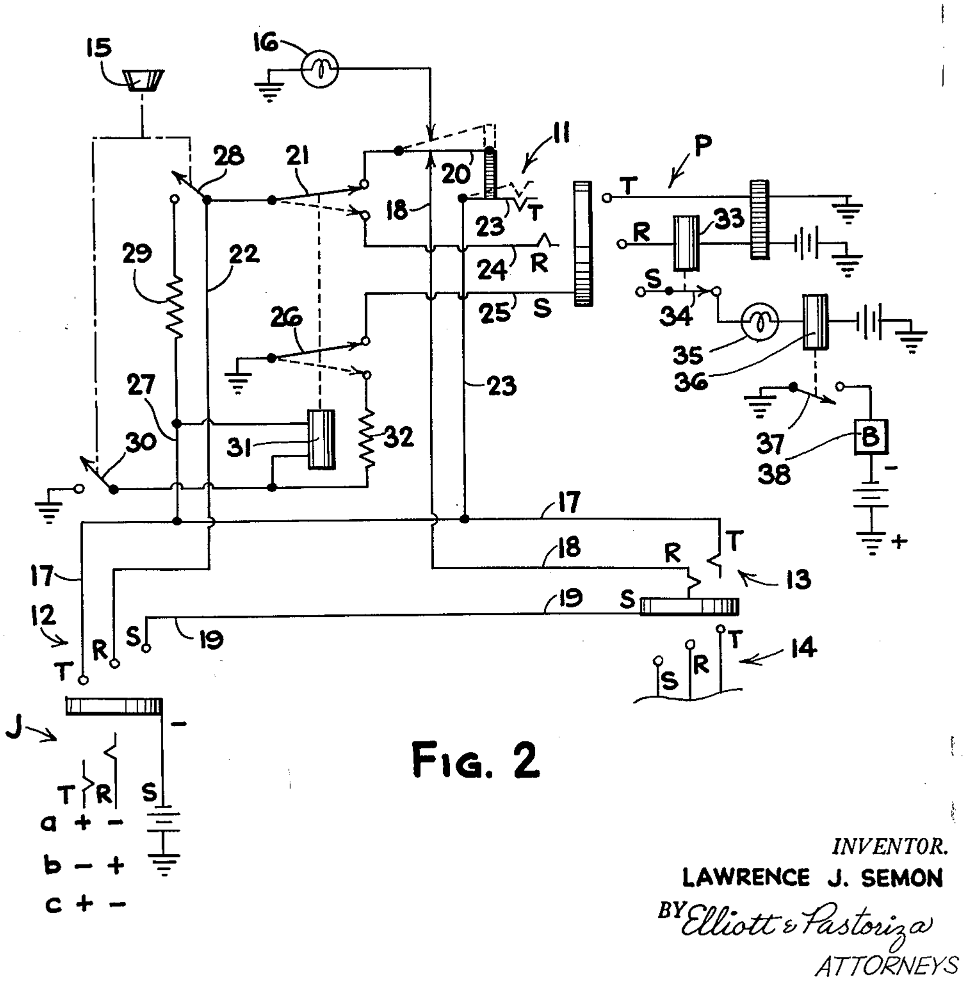

A better understanding of the various features and advantages of this invention will be had by now referring to a preferred embodiment as illustrated in the accompanying drawings, in which:

FIGURE 1 is a perspective view of the patching unit of this invention illustrating the unit in stand-by condition ready for use; and, FIGURE 2 is a detailed circuit diagram of the circuits within the patching unit in addition to various auxiliary circuits normally present in the telephone answering switchboard.

Referring first to FIGURE 1, the unit comprises a housing 10 provided with a jack 11 for connecting an incoming call. Also, there is provided a plug 12 for connection to an outgoing call jack in the switchboard so that a connection may be effected between the incoming call passed into the jack 11 and the outgoing call passed out of the plug 12. A dialing out plug jack 13 is provided in the bottom of the unit for receiving a dialing out switchboard plug 14. Normally, these dialing out switchboard plugs 14 are mounted in holders extending vertically from the switchboard panel so that the housing 10 may simply be inserted over the plug 14 and actually supported thereby.

The housing also includes a manually operable means in the form of a push button 15 for holding a dialed out call pending insertion of the incoming call plug in the jack 11. Also included is a signal means in the form of an indicating light 16 on the front of the housing 10 which is at all times visible to the telephone answering switchboard operator.

Referring now to FIGURE 2, the circuit means within the housing 10 includes tip, ring, and sleeve conductors 17, 18, and 19 as shown in the lower righthand portion of the drawing. These tip, ring, and sleeve conductors are respectively arranged to engage the corresponding tip, ring, and sleeve terminals of the dialing out switchboard plug 14 when the plug 14 is inserted in the jack 13 as is clear from FIGURE 2. The tip and sleeve conductors 17 and 19 connect straight through to the corresponding tip and sleeve terminals in the outgoing call jack J illustrated in the lower lefthand portion of FIGURE 2. The center ring conductor 18, on the other hand, is arranged to be connected to a first switch arm 20 as shown in the upper center portion of the drawing when the switch arm 20 is in a first solid line position as shown. A second switch arm 21 connects through a lead 22 directly to the ring terminal of the outgoing call jack J and is in series with the first switch arm 20 when the second switch arm 21 is in a first position as shown.

From the foregoing circuit as described thus far, it will therefore be evident that the dialing out plug 14 from the switchboard when inserted in the socket 13 will have its tip, ring, and sleeve terminals connected to the corresponding tip, ring, and sleeve terminals of the outgoing call jack J so that the operator may dial to an out-of-office subscriber.

An incoming call to be patched to the outgoing call dialed by the operator through the outgoing dialing plug 14 is received on an incoming call switchboard plug P illustrated in the upper righthand corner of FIGURE 2 arranged to be received within the jack 11 of the housing unit. As shown, this jack 11 includes tip, ring, and sleeve terminals 23, 24, and 25. The tip terminal 23 connects directly to the tip conductor 17 as shown. The ring terminal 24 terminates at the second switch arm 21 in a position to be engaged by the switch arm when moved to a second position. The sleeve terminal 25 passes through a third switch arm 26 when in a first position to connect to ground.

The housing also includes a holding means comprising a holding switch arm 28 and resistance 29. The switch arm 28 is arranged to be actuated by the manual push button means 15 and when closed will connect the resistance 29 across the ring and tip terminals of the outgoing call jack J through the lead 22. This same manual push button 15 is also arranged to throw a switch 30 to connect ground to one side of a relay 31. The other side of this relay connects to line 27 and the tip terminal of jack J from which it derives voltage. A holding resistance 32 connects from the switch arm 30 to a terminal in turn connecting to the third switch arm 26 when in a second or energized position.

As indicated schematically in FIGURE 2, the relay coil 31 is connected to operate both of the switch arms 21 and 26 simultaneously from their first to their second positions upon energization. The first switch arm 20 in turn is arranged to be actuated by the tip terminal 23 of the incoming call jack 11 only upon insertion of the plug P wherein the tip terminal of the plug P will urge upwardly the tip terminal 23 of the jack 11 to thereby move the switch arm 20 to its dotted line position, and connect it to the signal supervising lamp 16.

Referring now to the righthand portion of FIGURE 2 and particularly the plug P, there is shown conventional circuitry employed in most normal switchboards. As shown, the ring conductor of the plug P includes a relay coil 33 arranged to operate a switch arm 34 in the sleeve terminal. The switch arm 34 is in series with a supervising light 35, second relay coil 36, through a battery and then to ground. The second relay coil 36 operates a switch arm 37, which, in closed position, will cause a buzzer 38 to sound. The light 35 and buzzer 38 constitute normal supervision equipment present as a part of the switchboard.

In the operation of the patching unit, assume that a patient has telephoned a doctor, for example, who has a telephone answering service for answering his calls when he is not in the office. The call will then be transferred automatically to the telephone answering service when the doctor fails to answer. Oftentimes, the doctor will have left a message with the telephone answering operator as to where he may be reached on another telephone. If the patient calling requests to speak directly with the doctor, the operator will then first insert her normal switchboard dialing out plug 14 as shown in FIGURE 1 in the housing 10, if not already in position, and then insert the plug 12 in the outgoing call jack J shown in the lower lefthand portion of FIGURE 2. The voltages appearing across the terminals of the outgoing call jack J after the dialed out number is ringing is indicated at "*a*" wherein there is a plus potential on the tip terminal and a minus potential on the ring terminal. In the example chosen for illustrative purposes, a plus potential corresponds to ground. A straight-through connection from the dialing out plug 14 to the outgoing call jack J is effected through the tip and sleeve conductors 17 and 19 as described in conjunction with FIGURE 2 and the ring conductor 18, switch arm 20, which is in its solid line position, switch arm 21, which is in its solid line position, and conductor 22.

When the doctor answers the outgoing call, the voltage across the tip and ring terminals of the outgoing call jack J will be as shown at "*b*" wherein the tip becomes negative and the ring terminal positive. These voltages will remain on the terminals as long as the doctor is on the line.

When the operator has been connected with the doctor, she then depresses the button 15 which will close the holding switch 28 to connect the resistance 29 across the tip and ring terminals of the outgoing call jack J. This serves to hold the call on the outgoing jack while the operator inserts the incoming call plug P into the jack 11. Depression of the button 15 will also throw the switch arm 30 to ground the relay so that voltage from the tip conductor 17 and lead 27 will pass through the relay 31 thereby energizing this relay. Voltage on the tip conductor 17 is derived from the voltage appearing on the tip for the outgoing call jack J. Energization of the relay coil 31 will close the second and third switch arms 21 and 26 simultaneously, thereby opening the connection between the ring conductor 18 and the ring terminal in the jack J. However, since the holding resistance 29 and switch 28 are in circuit, the call on the jack J will not be lost.

When the second switch arm 21 is moved in response to energization of the relay 31, it will then connect the ring terminal 24 of the jack 11 through the switch arm 21 and lead 22 to the ring terminal of the jack J. At the same time, movement of the switch arm 26 to its second or energized position will connect ground through the switch arm 26 and holding resistance 32 to the relay 31. It should be understood that after the incoming call plug P has been inserted, the operator releases her hold on the button 15 so that the switch 30 opens. However, the relay 31 will be held in an energized state by the negative voltage appearing on the tip conductor 17 after the doctor has answered the phone which passes through the relay 31, resistance 32, and switch arm 26 to ground. The relay is thus maintained energized to hold the switch arm 21 in its second position. The tip and ring terminals of the plug P are now connected to the corresponding tip and ring terminals of the outgoing call jack J so that normal conversation can take place between the patient and doctor. Even though the first switch arm 20 is engaging the lead for the signal lamp 16, the signal lamp is not energized since the second switch arm 21 is now in its second position.

When the patched telephone call is completed and the doctor hangs up, the voltage on the terminals of the outgoing call jack J is changed and in the embodiment chosen for illustrative purposes, this voltage reverses so that the tip is positive and the ring negative as shown at "*c*" in the lower lefthand portion of FIGURE 2. With a positive voltage now applied to the tip conductor 17, the relay 31 is de-energized so that the switch arms 21 and 26 return to their first solid line positions shown. When the switch arm 21 is on its first position, negative voltage from the ring terminal of the jack J now passes up through lead 22 and switch arm 21 to the indicating lamp 16 to light the same and thereby advise the operator that the call has been completed. It should be understood that the first arm 20 is still held in its dotted line position because the incoming call plug is still inserted in the unit. When the operator sees the lamp 16 light, then she may simply remove the plug P and the incoming call line is available to receive other calls.

In addition to the foregoing, when the outgoing called party hangs up, the movement of the second switch arm 21 to its first position will open the ring terminal 24 of the jack 11, thereby de-energizing the relay 33 in the switchboard unit causing switch 34 to close as shown in solid lines. With the switch 34 closed, the ground connection of switch arm 26 is passed through the third switch arm 26 and sleeve terminal 25 from the jack 11 to the corresponding sleeve terminal in the incoming call plug P to the supervising light 35 in the telephone switchboard causing this light to light and also energizing relay 36. Energization of relay 36 closes the switch arm 37 to also energize the buzzer 38. There is thus provided, in addition to lighting of the signal means 16 in the housing, additional indicating means resulting from the illumination of the lamp 35 and sounding of buzzer 38 in the switchboard itself. The operator, in removing the incoming call plug P, will automatically cause the light 35 and buzzer 38 in the switchboard to become extinguished as a consequence of removal of any voltage from the sleeve terminal in the plug P. Also, removal of the plug P as stated will permit the tip terminal 23 of the jack 11 to lower the first switch arm 20 to its solid line position and thereby extinguish the signal lamp 16 in the housing.

From the foregoing description, it is thus seen that the present patching unit operates entirely from voltages available at the terminals of the outgoing call jack on the switchboard so that no auxiliary voltage supplies are necessary. Further, the supervision provided by the indicating lamp 16 as well as the indicating lamp and buzzer in the switchboard is entirely automatic and responsive to completion of the patched telephone call.

As mentioned heretofore, it should be understood that the signal means 16 is not an essential feature of the invention if the switchboard is provided with a normal supervising means as shown since the circuit within the housing is such as to make use of the switchboard supervising light and buzzer for supervising the patched call. This latter feature is an extremely important advance in the art since the supervision of an out-of-office call by the switchboard light and/or buzzer has never heretofore been achieved.

An auxiliary advantage of this unit is that when used with step-by-step central office equipment, the subscriber may signal the operator by flashing his receiver hook switch which changes the polarity on the jack J to operate the relay 31 and flash the signal lamp 16.

While particular voltage polarities have been shown and described in conjunction with the one embodiment of this invention, it will be understood that normal changes in the circuitry may be effected if the voltage polarities are different in different types of switchboards. The improved patching unit is therefore not to be thought of as limited to the exact embodiment set forth merely for illustrative purposes.

What is claimed is:

1. A switchboard patching unit for connecting and supervising a telephone call between an incoming call plug and an outgoing call jack on said switchboard comprising, in combination: a housing; circuit means in said housing for receiving and connecting said incoming call plug with said outgoing call jack; a signal means; control means in said circuit means connected to said signal means to energize said signal means in response to a change of voltage across the terminals of said outgoing call jack upon completion of said telephone call, said housing further including means for receiving a dialing out plug from said switchboard, said circuit means connecting said dialing out plug with said outgoing call jack prior to insertion of said incoming call plug in said housing and being responsive to said insertion of said incoming call plug in said housing to disconnect said dialing out plug.

2. The subject matter of claim 1, in which said housing includes manually operable holding means for temporarily holding said outgoing call until said incoming call plug is inserted in said housing.

3. In a telephone answering switchboard including a dialing out plug, an incoming call plug and an outgoing call jack in which voltage is available at the terminals of said outgoing call jack, a switchboard patching unit for connecting and supervising a telephone call between said call plug and call jack, said unit comprising, in combination: circuit means for connecting said dialing out plug with said outgoing call jack to enable dialing out of a telephone number; holding means for holding an answering call on said outgoing call jack; control switch means for connecting said incoming call plug to said outgoing call jack in response to insertion of said incoming call plug; and signal means connected to said control switch means, said control switch means being responsive to a change in said voltage at the terminals of said outgoing call jack occurring upon completion of said telephone call to actuate said signal means and advise an operator that said telephone call is completed.

4. The subject matter of claim 3, in which said circuit means includes tip, ring, and sleeve conductors, said tip and sleeve conductors connecting directly to the corresponding tip and sleeve terminals on said dialing out plug and said outgoing call jack, said control switch means including a first switch arm operable from a first position connecting it to said ring conductor to a second position connecting it to said signal means upon insertion of said incoming call plug; a second switch arm connected to the corresponding ring terminal in said outgoing call jack and operable from a first position connecting it in series with said first switch arm to a second position connecting it to the ring terminal of said incoming call plug; conductor means connecting the tip terminal of said incoming call plug directly to said tip conductor, said holding means comprising a resistance and holding switch arm for connecting the ring and tip terminals of said outgoing call jack across said resistance upon actuation; and manual means for operating said holding switch arm.

5. The subject matter of claim 4, in which said circuit means further includes a relay connected to operate said second switch arm to its second position upon energization; said manual means being operable to complete a circuit from said tip terminal of said outgoing call jack to energize initially said relay; and a third switch arm operable upon energization of said relay to hold said circuit from said tip terminal of said outgoing call jack to said relay to maintain it in an energized state after release of said manual means and when said telephone call is taking place, whereby said relay is released upon a change of voltage at said tip terminal upon completion of said call to move said second switch arm back to said first position to connect said ring terminal through said series connected first switch arm to said signal means to energize the same, removal of said incoming call plug moving said first switch arm to its first position to de-energize said signal means.

6. The subject matter of claim 5, in which said incoming call plug includes supervising indicator means in said switchboard, said control switch means including means responsive to said change in voltage for actuating said supervising indicator means.

7. The subject matter of claim 6, in which said last mentioned means includes said third switch arm and relay wherein said third switch arm is operable by said relay and upon deenergization of said relay moves to a position to connect ground directly to the sleeve terminal of said incoming call jack to complete a circuit to actuate said supervising indicator means.

References Cited in the file of this patent

UNITED STATES PATENTS 2,952,744 Semon ---------------- Sept. 13, 1960